United States Patent [19]

Inniss et al.

[11] Patent Number: 5,214,734
[45] Date of Patent: May 25, 1993

[54] OPTICAL FIBER WITH IMPROVED MOISTURE RESISTANCE

[75] Inventors: Daryl Inniss, Hillsborough; Charles R. Kurkjian, Basking Ridge; Michael J. Matthewson, Somerville, all of N.J.

[73] Assignee: AT&T Bell Laboratories, Murray Hill, N.J.

[21] Appl. No.: 856,792

[22] Filed: Mar. 24, 1992

[51] Int. Cl.$^5$ .................. G02B 5/172; G02B 6/00
[52] U.S. Cl. .................... 385/128; 385/141
[58] Field of Search .............. 385/123, 124, 125, 128, 385/141

[56] References Cited

U.S. PATENT DOCUMENTS

| | | | |
|---|---|---|---|
| 4,380,367 | 4/1983 | Suzuki | 350/96.34 |
| 4,427,823 | 1/1984 | Inagaki et al. | 524/833 |
| 4,477,626 | 10/1984 | Suzuki | 524/862 |
| 4,525,026 | 6/1985 | Elion | 385/141 |
| 4,697,877 | 10/1987 | Kida | 350/96.3 |
| 4,714,801 | 12/1987 | Koblitz et al. | 174/88 R |
| 4,921,880 | 5/1990 | Lee | 522/12 |
| 4,923,754 | 5/1990 | Lee | 428/429 |
| 4,935,455 | 6/1990 | Huy | 522/99 |
| 4,946,874 | 8/1990 | Lee | 522/14 |
| 4,952,711 | 8/1990 | Jacobine | 522/99 |
| 4,962,996 | 10/1990 | Cuellar | 350/96.34 |
| 5,000,541 | 3/1991 | DiMarcello et al. | 350/96.3 |
| 5,004,869 | 4/1991 | Koblitz et al. | 174/84 C |
| 5,033,815 | 7/1991 | Edahira et al. | 385/128 |

OTHER PUBLICATIONS

N. Levy and P. E. Massey, "Effects of Composition and Polymerization Mechanism on the Mechanical Properties of UV-Cured Crosslinked Polymers," *Polymer Eng. Science* 21, 1981, 406-414.

D. Inniss, et al., "Effect of Sodium Chloride Solutions on the Strength and Fatigue of Bare Silica Fibers," *J. Am. Ceram. Soc.* 75, 1992, 364-368.

*Primary Examiner*—Akm E. Ullah
*Attorney, Agent, or Firm*—M. I. Finston; Eugen E. Pacher

[57] ABSTRACT

An optical fiber which is enclosed within a polymeric jacket. At least a portion of the jacket material comprises a particulate material which is at least partially soluble in water, such that a solution can be formed which has reduced reactivity toward the optical fiber, relative to pure water. An amount of such material is incorporated in the jacket, sufficient to delay the expected onset of accelerated fiber fatigue in a standard fatigue test by at least a factor of 2 relative to an otherwise similar fiber enclosed within a jacket which is free of the particulate material.

11 Claims, 1 Drawing Sheet

OPTICAL FIBER WITH IMPROVED MOISTURE RESISTANCE

FIELD OF THE INVENTION

This invention relates to the field of optical fibers, and more particularly, to optical fibers which include polymeric jackets for environmental protection and protection against handling.

ART BACKGROUND

It has long been known that silica-based optical fibers (i.e., optical fibers having cladding and core compositions which are at least 80% silicon dioxide) may be chemically attacked by environmental water, resulting in weakening of the fibers. In experimental tests, evidence of such weakening may be provided by static fatigue tests, in which optical fibers are subjected to constant stress for an extended period of time in an active environment such as hot water. The resistance of a particular class of fibers to corrosion may be related to the fatigue life, i.e., the average time which elapses before the fibers fail in such tests.

Practitioners have tried various methods for improving the fatigue life of optical fibers. For example, U.S. Pat. No. 5,033,815, issued to T. Edahiro, et al. on Jul. 23, 1991, describes efforts to improve the fatigue life of optical fibers by modifying the chemical composition of an outer glass cladding layer. An alternative technique is to use a hermetic coating to prevent water from coming into contact with the glass of the optical fiber. Hermetic coatings of carbon are described, e.g., in U.S. Pat. No. 5,000,541, issued to F. V. DiMarcello, et al. on Mar. 19, 1991.

It is conventional to enclose optical fibers within protective, polymeric jackets. If a polymeric jacket could be provided which gave effective protection against water, such a jacket would be advantageous either as a supplement, or as an alternative, to the measures described above. In particular, such a jacket could potentially be used independently of the particular fiber design and composition, and could be used to protect relatively simple and inexpensive fibers. However, although polymeric jackets have been found useful for maintaining the mechanical and optical properties of optical fibers, they have also generally been found to be permeable to water. As a consequence, they are only of limited value for protecting fibers from weakening by aqueous attack.

SUMMARY OF THE INVENTION

We have found that by adding particles of an appropriate material to the polymeric jacket material of an optical fiber, we can, to at least some extent, protect the fiber from loss of strength which is related to exposure of the fiber to moisture. An appropriate material is one which is at least partially soluble in water, such that a solution can be formed which has reduced reactivity toward the fiber, relative to pure water. For example, such a material may be a component of a glass-forming system which includes the composition of the fiber. (It should be noted in this regard that such material need not be a component of the fiber glass itself.)

More specifically, we have found that particles of fumed silica are effective in providing protection against moisture to high-strength, silica-based optical fibers.

In order to quantify the weakening effects observed in high-strength fibers, we have conducted standard fatigue tests in which fibers are exposed to an aqueous environment and statically loaded, and the applied stress is recorded versus the time to failure. It is well-known that when the logarithm of the applied stress is plotted versus the logarithm of time, a bent curve is often obtained which may be approximated by a pair of straight line segments which intersect at a knee. The initial line segment, corresponding to earlier times, generally has a smaller slope. The final line segment, corresponding to later times, generally has a greater slope. The later period of time is referred to herein as the region of accelerated fatigue. Such tests make it possible to make a statistical prediction of the expected onset of accelerated fatigue in a given fiber.

With reference to FIG. 1, the invention in one embodiment involves a silica-based optical fiber 10 substantially enclosed within a jacket 20, 30, here referred to as the "first" jacket, which comprises an organic polymer. The first jacket includes at least one layer, to be referred to as the "filled" layer. The composition of the filled layer includes an amount of appropriate particulate material, e.g., fumed silica, sufficient to delay the expected onset of accelerated fatigue of the enclosed optical fiber, in standard fatigue tests, by at least a factor of 2 relative to an otherwise similar fiber enclosed within a jacket, here referred to as the "second" jacket, which is free of the particulate material.

DETAILED DESCRIPTION

According to a currently preferred embodiment of the invention, a high-strength, silica-based optical fiber is first provided. A high-strength fiber is a fiber which, with high confidence, will exhibit a strength of at least about 700 –800 ksi (4.9–5.6 GPa) in a normal tensile test, about ten seconds in duration, at ambient conditions. A typical such fiber is the 125-$\mu$m fiber available from AT&T under the tradename D-LUX 100 LIGHT-GUIDE FIBER. An appropriate, uv-curable, silica-filled, liquid pre-polymer formulation is prepared, conventionally applied to the fiber, and cured to form a polymer jacket. To be useful for this purpose, a prepolymer formulation should have an appropriate viscosity for application, and it should be tough enough to limit abrasion, non-tacky when properly cured, and strippable. Moreover, if it is used to form a primary jacket layer, it should be compliant enough to limit added optical loss. An exemplary class of pre-polymers, useful in this context, comprise two monomers, 2-ethoxyethoxyethylacrylate and N-vinyl-pyrrolidone, and a higher-molecular-weight resin which is a commercial urethane diacrylate. Pre-polymers of such class additionally contain a photoinitiator such as 2,2-dimethoxy-2-phenylacetophenone. A description of such pre-polymer formulations is given in N. Levy and P. E. Massey, "Effects of Composition and Polymerization Mechanism on the Mechanical Properties of UV-Cured Crosslinked Polymers", *Polymer Eng. Science* 21 (1981) 406–414.

Figure 1:
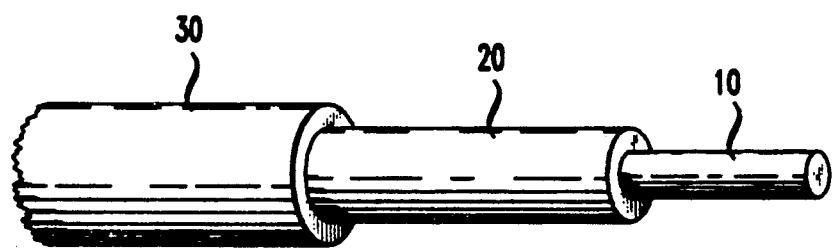
FIG. 1 is a schematic drawing of an exemplary optical fiber enclosed within a polymeric jacket.

With further reference to FIG. 1, a single polymer layer may be applied, or, alternatively, a multiple-layer jacket, including a primary layer 20 closest to the fiber and at least one secondary layer 30, may be formed on the fiber. In contrast to the prior art, at least one primary and/or secondary layer is filled with particulate, e.g. fumed, silica. The silica-filled layer may be the sole layer of the jacket, as is currently preferred, or, alternatively, it may be any layer or layers of a multiple-layer jacket.

According to our current understanding, permeation of water through conventional polymer jackets contributes to the weakening of optical fibers as demonstrated, e.g., by standard fatigue tests. We believe that as water permeates a silica-filled jacket layer, silica is leached from the jacket and enters solution. Consequently, the permeating water which reaches the optical fiber is saturated, or nearly saturated, with silica. This reduces the propensity of the water for attacking the glass of the optical fiber. In standard fatigue tests, we have compared the performance of conventionally jacketed fibers with substantially identical fibers in silica-filled jackets which are otherwise substantially identical to the conventional jackets. In such tests, we have demonstrated that the onset of accelerated fatigue is readily delayed by a factor of 2, and can be delayed, in fact, by a factor of 30 or more.

Accordingly, the amount of particulate silica which is to be added to the polymer should be sufficient to cause, on the average, at least a twofold delay in the onset of accelerated fatigue, relative to a conventionally jacketed fiber, as determined by a standard fatigue test. We have found that about 0.5%–1% silica by weight is sufficient to bring about such increase when added to the exemplary prepolymer material. The silica preferably has an average particle diameter of about 1 $\mu$m or less. In a primary jacket layer, particles substantially larger than about 3 $\mu$m may abrade the fiber. Moreover, the smaller the particle size, the more rapidly the particles will dissolve and tend to equilibrate with the water in their environment. The more rapidly the particles dissolve, the greater will be the protective effect, in general. To assure sufficiently rapid dissolution, the particles are preferably no more than about 1 $\mu$m in diameter, or even smaller. However, it should be noted that the finer the particles, the greater might be the difficulty of degassing the silica-prepolymer mixture.

One acceptable preparation of particulate silica is fumed silica which is commercially available from the Cabot Corporation, Cab-O-Sil-Division, of Tuscola, Ill. under the tradename CAB-O-SIL ®. Various grades of CAB-O-SIL are available, having an average primary particle diameter ranging from 7 nm (BET surface area of 380 m$^2$/g) to 24 nm (BET surface area of 90 m$^2$/g).

Prior to application of the uncured jacket material to the fiber, the jacket material and particulate silica are mixed, and then heated in order to degas the mixture. Degassing is typically carried out at a temperature of about 40° C. for a duration of about 10 hours. Exposure to actinic radiation is avoided in order to prevent premature curing of the polymer.

Particulate materials other than silica are also usefully employed in the inventive context. For example, useful optical fibers can be made from glass formulations which are not silica-based. Exemplary of such formulations are glasses which comprise fluorides of zirconium, boron, lanthanum, aluminum, and sodium. Particles of the same composition as the fiber, such as the above-mentioned fluoride composition, are readily incorporated in the jacket material in order to reduce the reactivity which moisture in the jacket will exhibit toward the fiber.

It is well-known that the solubility of a first material in water may be limited by the dissolution of a second material. The dissolution of the second material may, in fact, be thermodynamically preferred. In such a case, the dissolution of a relatively large amount of the second material may, in effect, saturate the aqueous medium with respect to dissolution of the first material. That is, the solubility of the first material in water saturated with the second material may be much smaller than the solubility of the first material in pure water. This suggests one respect in which particles incorporated in the jacket material can protect an optical fiber from moisture, even if the composition of the fibers is not the same as the composition of the fiber. We recognize, however, that such solution equilibria may provide only one of several mechanisms by which the dissolution of particles in water within a fiber jacket will reduce the reactivity of the water toward the fiber.

In general, the composition of a given optical fiber will be a subset of a larger family of glass-forming components. Thus, for example, many useful silica-based fibers, such as silica fibers or silica-alumina fibers, belong to a glass-forming family such as $Na_2O$—$CaO$—$Al_2O_3$—$SiO_2$—$TiO_2$ or $Na_2O$—$CaO$—$Al_2O_3$—$SiO_2$—$P_2O_5$. According to out current belief, particles comprising at least certain members or combinations of members of such a family will tend to reduce the reactivity of moisture in the jacket toward a fiber whose composition belongs to a subset of the same family. In particular, particles which comprise one or more components of the fiber may be useful, but even compositions which are not so limited are expected to produce useful results. Thus, particles which comprise at least certain metal oxides are expected to protect fibers belonging to the last-mentioned family. Similarly, particles which release at least certain metal cations or fluoride anions are expected to protect fibers of the family, mentioned above, comprising the fluorides of Zr, B, La, Al, and Na.

In particular, it should be noted that that if the fiber has a glass surface layer which differs in composition from the bulk of the fiber, it is the surface composition which is more important in selecting a protective composition for the particles. Thus, for example, alumina, titania or zirconia particles are expected to help protect pure silica fiber, but are expected to be even more helpful in protecting silica fiber which has, respectively, an alumina-doped, titania-doped, or zirconia-doped surface layer.

EXAMPLE

Figure 2:
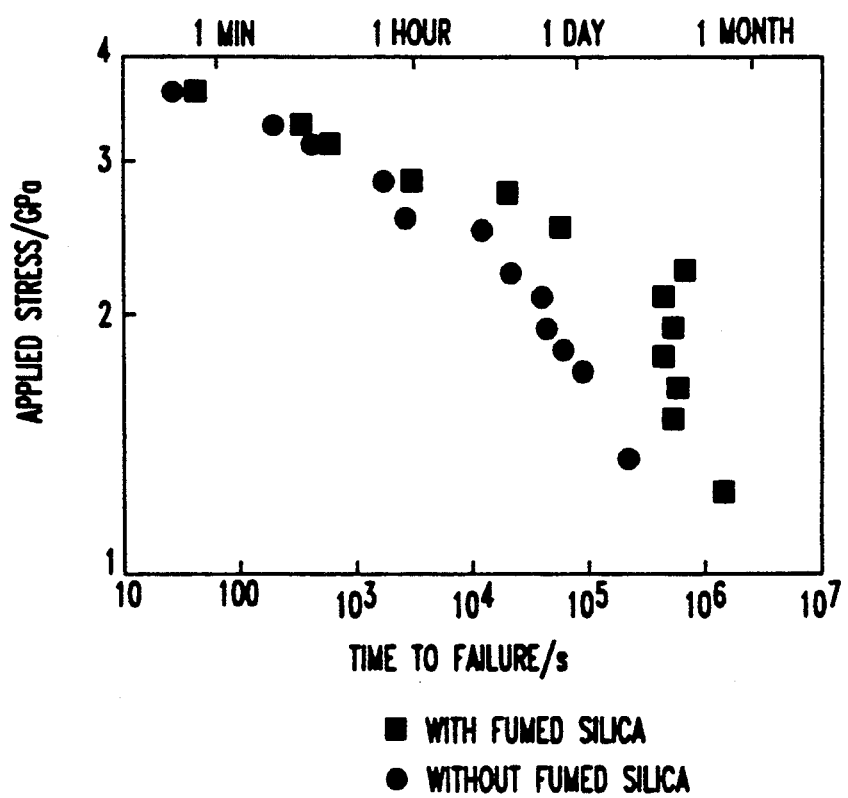
FIG. 2 is a graph of the the results of a comparison, in standard fatigue tests, between an optical fiber enclosed within a conventional, polymeric jacket, and a similar fiber enclosed within a silica-filled jacket. The graph represents the logarithm of applied stress on the fiber versus the logarithm of time to failure of the fiber.

Two groups of 125-$\mu$m, high strength, silica optical fibers were coated with a single-layer polymeric jacket formed by applying and uv-curing a prepolymer. In one group, the jacket material was not silica filled. In the other group, the jacket material was filled with about 0.5–1 wt. % CAB-O-SIL fumed silica. Each group was subjected to a fatigue test in water at 90° C, buffered to pH 7. The results of the tests are shown in the graph of the logarithm of applied stress versus the logarithm of time to failure of FIG. 2. It is evident in the figure that the silica-filled group exhibited a distinct knee in the strain curve at approximately $4 \times 10^5$ seconds. The unfilled group exhibited a less pronounced knee at approximately $2 \times 10^4$ seconds. Thus, the onset of accelerated fatigue in the filled group was delayed by at least a factor of about 20.

We claim:

1. An article which comprises an optical fiber enclosed within a jacket comprising at least one layer of polymeric material, wherein:
   a) the optical fiber comprises a glass material;
   b) the optical fiber has an expected onset of accelerated fiber fatigue at a statistically predictable time when subjected to a standard fatigue test, said time to be referred to as the "fatigue life";
   c) the polymeric layer comprises an admixture of particulate material; and
   d) the particulate material tends to form an aqueous solution that is less reactive toward the glass material than pure water, CHARACTERIZED IN THAT
   e) the particulate material has an average particle diameter of 3 μm or less;
   f) the particulate material is present in an amount sufficient to increase the fatigue life by a factor of 2 or more relative to an otherwise identical article that comprises no particulate material; and
   g) the amount of particulate material is less than 1.0 wt. %.

2. The article of claim 1, wherein the particulate material is a component of a glass-forming system which includes the glass material.

3. The article of claim 1, wherein the optical fiber is a silica-based fiber, and the particulate material comprises silica.

4. The article of claim 3, wherein the particulate silica has an average particle diameter less than about 1 μm.

5. The article of claim 1, wherein the optical fiber is a silica-based fiber, and the particulate material comprises titania.

6. The article of claim 1, wherein the optical fiber is a silica-based fiber, and the particulate material comprises zirconia.

7. The article of claim 1, wherein the optical fiber is a silica-based fiber, and the particulate material comprises alumina.

8. The article of claim 1, wherein the optical fiber is enclosed within a polymeric inner layer contactingly disposed around the fiber, and a polymeric outer layer contactingly disposed around the inner layer; and the outer layer comprises particulate material but the inner layer does not.

9. The article of claim 2, wherein the glass material is a metal-oxide glass which has no metallic elemental components in common with the particulate material.

10. The article of claim 1, wherein the glass material is a glass which is not silica-based.

11. The article of claim 1, wherein the glass material is a metal-fluoride glass.

* * * * *